US012769729B2

(12) United States Patent
Kosuru et al.

(10) Patent No.: US 12,769,729 B2
(45) Date of Patent: Oct. 20, 2026

(54) EFFICIENT USER-DEFINED FUNCTION EXECUTION AND ARTIFICIAL INTELLIGENCE MODEL INVOCATION

(71) Applicant: Hewlett Packard Enterprise Development LP, Spring, TX (US)

(72) Inventors: Ramakumar V. Kosuru, Austin, TX (US); Ronald Tischler, San Jose, CA (US); Adam Romayor, La Jolla, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/821,241

(22) Filed: Aug. 30, 2024

(65) Prior Publication Data

US 2026/0064675 A1 Mar. 5, 2026

(51) Int. Cl.

| | |
|---|---|
| ***G06F 16/2452*** | (2019.01) |
| ***G06F 16/2453*** | (2019.01) |
| ***G06F 16/2457*** | (2019.01) |
| ***G06F 16/25*** | (2019.01) |

(52) U.S. Cl.

CPC .... *G06F 16/2452* (2019.01); *G06F 16/24542* (2019.01); *G06F 16/24573* (2019.01); *G06F 16/252* (2019.01)

(58) Field of Classification Search

CPC ........... G06F 16/2452; G06F 16/24573; G06F 16/24542; G06F 16/252

See application file for complete search history.

(56) References Cited

U.S. PATENT DOCUMENTS

| | | | | |
|---|---|---|---|---|
| 2015/0379076 | A1* | 12/2015 | Grosse | G06F 16/2448 707/718 |
| 2017/0193054 | A1* | 7/2017 | Tang | G06F 16/24575 |
| 2019/0026336 | A1* | 1/2019 | Tian | G06F 16/2455 |
| 2020/0233661 | A1* | 7/2020 | Grosse | G06F 8/45 |
| 2020/0394192 | A1* | 12/2020 | Fender | G06F 16/24542 |
| 2024/0119050 | A1* | 4/2024 | Interlandi | G06N 3/10 |

OTHER PUBLICATIONS

IBM, "Create Function (external scalar)", available online at <https://www.ibm.com/docs/en/i/7.4?topic=statements-create-function-external-scalar>, Oct. 10, 2023, 22 pages.

SQL, "Scalar UDF Inlining", available online at <https://learn.microsoft.com/en-us/sql/relational-databases/user-defined-functions/scalar-udf-inlining?view=sql-server-ver16>, Nov. 19, 2022, 11 pages.

Alpydin, Ethem; Introduction to Machine Learning, MIT Press, p. 294; 2020.

Haykin, Simon; Neural Networks and Learning Machines; Pearson Education Inc. 2018.

IBM, Create Function (external scalar); Oct. 10, 2023; IBM DB2 Manual: https://www.ibm.com/docs/en/i/7.4?topic=statements-create-function-external-scalar.

MS Sever Manual: Scalar UDF Inlining in Microsoft SQL Server—SQL Server | Microsoft Learn; Nov. 18, 2022.

* cited by examiner

*Primary Examiner* — William P Bartlett

(74) *Attorney, Agent, or Firm* — Fletcher Yoder, P.C.

(57) ABSTRACT

Efficient implementation of user defined functions (UDFs) is provided herein. Specifically, a database management system (DBMS) compiler may receive a UDF and a query that includes a relational operator and an indication of the UDF that is associated with the relational operator. The compiler may attach the UDF to the relational operator in the query plan, which indicates an execution order of components of the query.

20 Claims, 9 Drawing Sheets

700

702

| QUERY FEATURE | PC1 | PC2 | PC3 | PC4 | PC5 | PC6 | PC7 | PC8 |
|---|---|---|---|---|---|---|---|---|
| query_complexity | 0.11 | -0.07 | -0.14 | -0.09 | -0.19 | -0.03 | -0.44 | -0.34 |
| total_cost | 0.17 | 0.37 | -0.06 | -0.18 | 0.10 | 0.01 | -0.04 | 0.03 |
| est_memory_per_cpu | 0.27 | -0.07 | 0.06 | 0.34 | 0.03 | -0.35 | 0.13 | -0.06 |
| total_est_memory | 0.25 | 0.02 | 0.11 | 0.46 | -0.12 | -0.23 | 0.14 | -0.09 |
| keyless_njs | 0.00 | 0.00 | 0.08 | -0.07 | -0.05 | 0.05 | 0.18 | -0.43 |
| fulltab_scans | 0.11 | -0.04 | 0.61 | -0.24 | -0.03 | -0.12 | -0.07 | 0.12 |
| lowyield_exchs | 0.32 | -0.19 | -0.11 | -0.15 | -0.11 | 0.06 | -0.04 | -0.08 |
| skew_joins | 0.06 | -0.06 | -0.09 | -0.13 | 0.05 | 0.19 | 0.61 | 0.30 |
| skew_exchs | 0.32 | -0.19 | -0.11 | -0.15 | -0.12 | 0.07 | -0.4 | -0.08 |
| total_skew_ops | 0.32 | -0.18 | -0.09 | -0.16 | -0.12 | 0.12 | 0.06 | -0.10 |
| total_ops | 0.33 | -0.20 | -0.10 | -0.08 | 0.02 | 0.02 | -0.04 | 0.05 |
| total_join | 0.32 | -0.20 | -0.10 | -0.09 | 0.01 | 0.02 | -0.03 | 0.06 |
| mj_ops | 0.14 | -0.10 | 0.16 | 0.15 | 0.52 | 0.06 | -0.08 | -0.03 |
| nj_ops | 0.25 | -0.15 | -0.06 | 0.06 | 0.22 | -0.04 | 0.11 | 0.29 |
| tot_tc_proc | 0.17 | 0.37 | -0.06 | -0.18 | 0.11 | 0.00 | -0.03 | 0.02 |
| tot_tc_prod | 0.20 | 0.33 | 0.02 | 0.17 | -0.09 | -0.05 | 0.08 | -0.08 |
| tot_tc_sent | 0.11 | 0.12 | 0.08 | 0.31 | -0.28 | 0.44 | -0.13 | 0.22 |
| tot_seq_ios | 0.17 | 0.36 | -0.07 | -0.20 | 0.11 | 0.01 | -0.04 | 0.03 |
| tot_rand_ios | 0.12 | 0.11 | 0.13 | 0.25 | -0.22 | 0.49 | -0.16 | 0.22 |
| rows_accessed | 0.17 | 0.37 | -0.07 | -0.20 | 0.11 | 0.01 | -0.04 | 0.03 |
| rows_used | 0.20 | 0.31 | 0.03 | 0.19 | -0.07 | -0.20 | 0.14 | -0.16 |
| Total_anomalousScan | 0.10 | -0.04 | 0.63 | -0.23 | -0.04 | -0.08 | -0.05 | 0.09 |
| Total_anomalousJoin | 0.04 | -0.04 | -0.03 | 0.13 | 0.51 | 0.21 | 0.03 | -0.09 |
| Total_anomalousGby | -0.02 | 0.03 | 0.17 | -0.12 | -0.15 | 0.30 | 0.49 | -0.43 |
| Total_anomalousSrt | 0.04 | -0.02 | 0.16 | 0.13 | 0.33 | 0.35 | -0.16 | -0.37 |

704

```
1) root 663 304 2 (0.242835596 0.541478130 0.215686275)
2) PC1>-3.544 138 1 1 (0.992753623 0.007246377 0.000000000)+
3) PC1>=-3.544 525 167 2 (0.045714286 0.681904762 0.272380952)
6) PC8>=-0.2015315 301 71 2 (0.043189369 0.764119601 0.192691030)
12) PC4<1.706414 293 65 2 (0.044368601 0.778156997 0.177474403) +
13) PC4>=7.706414 8 23 (0.000000000 0.250000000 0.750000000)+
7) PC8>=0.2015315 224 96 2 (0.049107143 0.571428571 0.379464286)
14) PC5<0.4383342 137 41 2 (0.065693431 0.700729927 0.233576642)
28) PC4>=-1.090134 113 25 2 (0.044247788 0.778761062 0.196991150)+
29) PC4<=1.090134 24 12 3 (0.166666667 0.333333333 0.500000000)
58) PC8<=1.0381136 10 3 2 (0.200000000 0.700000000 0.100000000)+
59) PC8>=-1.038113 14 3 3 (0.142857143 0.071428571 0.785714286)+
15) PC5>=-0.4383342 87 34 3 (0.022988506 0.367816092 0.609195402)
30) PC7<-1.198651 16 2 2 (0.062500000 0.875000000 0.062500000)+
31) PC7<-1.198651 71 19 3 (0.014084507 0.253521127 0.732394366)
62) PC5<1.038247 27 13 3 (0.037037037 0.444444444 0.518518519)
124 PC3<-0.3263525 13 3 2 (0.000000000 0.769230769 0.230769231)+
125 P3>=-0.3263525 14 3 3 (0.071428571 0.142857143 0.785714286)+
63) PC5>=1.038247 44 6 3 (0.000000000 0.136363636 0.863636364)+
```

706

```
create function Inference_UDF
    (PC1 numeric, PC2 numeric, PC3 numeric, PC4 numeric, PC5 numeric,
    PC6 numeric, PC7 numeric, PC8 numbric
    return INTEGER language plmx is
begin
 if PC1 <-3.544 then
  return 1;                  /* 2 */
 else                        /* 3 */
  if PC8 >=-0.2015315 then        /* 6 */
   if PC4 < 1.706414 then
    return 2;                /* 12 */
   else
    return 3;                /* 13 */
   end if;
  else                       /* 7 */
   if PC5 < 0.4383342 then        /* 14 */
    if PC4 >=-1.090134 then
     return 2;               /* 28 */
    else                     /* 29 */
     if PC8 <-1.038113 then
      return 2;              /* 58 */
     else
      return 3;              /* 59 */
     end if;
    end if;
   else                      /* 15 */
    if PC7<-1.198651 then
     return 2;               /* 30 */
    else                     /* 31 */
     if PC5<1.038247 then     /* 62 */
      if PC3<-0.3263525 then
       return 2;             /* 124 */
      else
       return 3;             /* 125 */
      end if;
     else
      return 3;              /* 63 */
     end if;
    end if;
   end if;
  end if;
 end if;
end;
```

708 710 712

Select Inference_UDF(PC1, PC2, PC3,PC4, PC5, PC6, PC7, PC8) from T1;

714

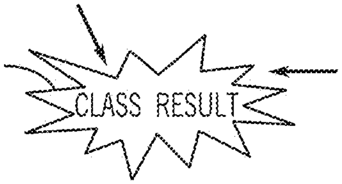

FIG. 7

EFFICIENT USER-DEFINED FUNCTION EXECUTION AND ARTIFICIAL INTELLIGENCE MODEL INVOCATION

BACKGROUND

Database systems provide analysis capabilities for vast amounts of data. A database management system (DBMS), such as SQL/MX, is tasked with execution of queries of stored data through a multi-phase approach. Received queries are parsed and checked for syntactical accuracy. A query plan is generated and optimized, defining a cost-effective execution strategy for the query.

A user-defined function (UDF), a custom function developed outside of the database programming language (e.g., a Structured Query Language (SQL), Python or other programming language), may be provided in the query to add customized functionality to the query. A dedicated external server process may execute UDFs external to an execution engine of the DBMS that executes the query plan. The results of the execution of the UDF may be supplied to the execution engine, enabling the UDF to support the query execution.

BRIEF DESCRIPTION OF THE DRAWINGS

Features, aspects, and advantages of the present disclosure will become better understood when the following detailed description is read with reference to the accompanying drawings in which like characters represent like parts throughout the drawings, wherein:

FIG. 7 is a diagram, illustrating an example implementation of the process of FIG. 6 to provide class inference, in accordance with aspects of the present disclosure;

DETAILED DESCRIPTION

One or more specific aspects of the present disclosure will be described below. In an effort to provide a concise description of these aspects, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure relates generally to execution of user-defined functions (UDFs) within a relational database. More specifically, the present disclosure relates to efficient execution of UDFs by attaching UDF instances to relational operators in a query plan executed by a DBMS execution engine. In this manner, the execution of UDFs may benefit from the parallel processing capabilities of the DBMS execution engine, resulting in fast and efficient UDF and/or query processing. In some cases, such UDF instances may be executed without the use of an external server tasked with executing the UDF. This improved UDF execution and parallel processing enables new functionalities that may be performed via the DBMS execution engine. For example, UDFs may be developed and implemented for performance of: an analytics inference/classification functionality that is useful in many artificial intelligence (AI)/machine learning (ML) implementations, linear regression modelling functionality, and/or neural network classification functionality.

Figure 1:
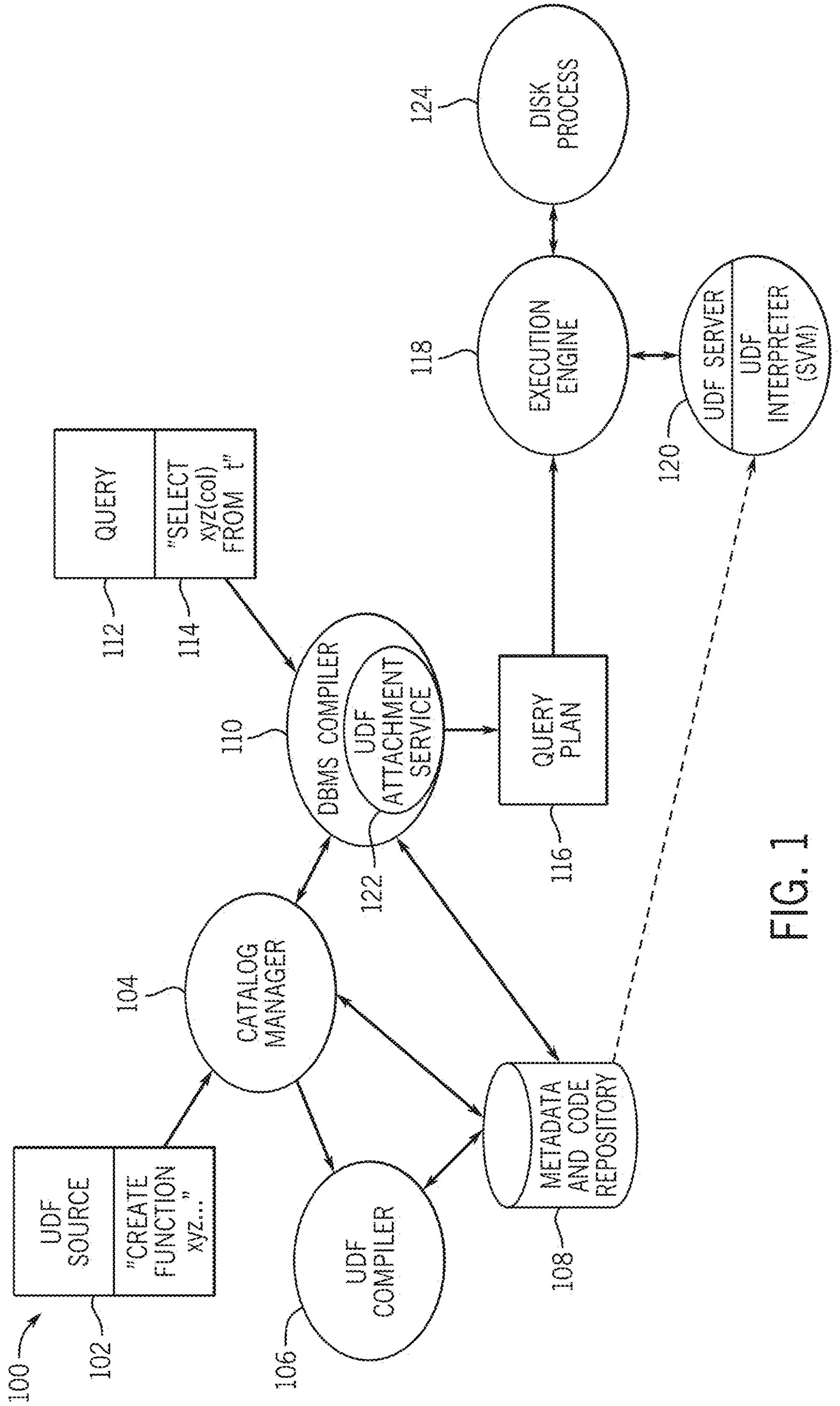
FIG. 1 is a diagram, illustrating a system that implements user-defined functions (UDFs) within a database management system (DBMS) execution engine, in accordance with aspects of the present disclosure.

With this in mind, FIG. 1 is a diagram, illustrating a system 100 that implements user-defined functions (UDFs) within a database management system (DBMS) (e.g., SQL/MX, Db2, MongoDB, or other database management systems) execution engine, in accordance with aspects of the present disclosure. The DBMS is a system that creates and manages databases, while providing security and data integrity. For example, a relational database management system, such as SQL/MX, stores data in the form of related tables of rows and columns, enabling querying of these tables to retrieve desired subsets of data from the tables.

UDFs are generated to provide additional functionality outside typical offerings of a database system. As illustrated, an entity, such as a user, group of users, and/or other entity such as a program or machine, may generate a UDF source 102 (e.g., code, statements, or other computer-interpretable data) that defines a UDF's functionality. For example, UDFs may be written in a procedural language (PL), such as PL/MS, ANSI SQL/PSM, PostGreSQL PL/pgSQL, Oracle PL/SLQ, and/or IBM SQL PL, which offers developers comparatively more flexibility than declarative language offerings, such as a structured query language (SQL), provided by a DBMS. Thus, end-users may design and implement UDFs that provide customized functionality that may provide increased flexibility and/or customization to database queries. Here, the UDF source 102 includes a "Create Function" statement, specifying "xyz" as a UDF to create in the database.

A catalog manager 104 of the DBMS may manage metadata and physical structures of database objects. For example, the catalog manager 104 may perform Data Definition Language (DDL) database statements to create, alter, and/or drop database objects that will be used in query execution. Thus, as illustrated, the UDF source 102 may be provided for cataloging by the catalog manager 104, resulting in the creation of objects that will support implementation/execution of the UDF source 102.

The UDF source 102 may include code (e.g., procedural language code, object oriented code, or any other programming code), written by an end-user (e.g., a user, group of users, machine, and/or software). The UDF source 102 may be provided to a UDF compiler 106 (e.g., PL/MX, C Compiler, and/or other code compiler), which generates an executable UDF object (compiled UDF) from the UDF source 102. The UDF source 102 and the UDF object may be stored in the database, such as in the Metadata and Code Repository 108.

The DBMS compiler 110 may receive and compile queries 112 for execution by the DBMS. When a query 112 includes use a UDF, an indication 114 of the UDF may be provided in the query 112. For example, here, the indication 114 of a UDF named "xyz" with a parameter named "col" serves as an expression of a select operation within the query 112.

The DBMS compiler 110 determines whether the parameters provided in the indication 114 are valid for the UDF object in the Metadata and Code Repository 108 (e.g., whether the number of parameters and parameter types that are supplied in the indication 114 match those used by the UDF). If the parameters are valid, the UDF is added to a query plan 116 generated by the DBMS compiler 110, which is performed/executed by the execution engine 118 to complete the query 112. In some implementations, the query plan 116 may include a relational tree including components of the query (e.g., relational operators of the query 112) ordered in an optimized execution order.

In some instances, the DBMS compiler 110 may cause a UDF of the query 112 to be executed by a remote process, such as a UDF server/interpreter 120 (e.g., a SQL virtual machine, a Linux machine, or any other remote processing device), separate from/external to execution by an execution engine 118 that executes other portions of the query 112. In other instances, the DBMS compiler 110 may cause a UDF of the query 112 to be performed/executed by the execution engine 118.

To cause the UDF to be implemented by the UDF server/interpreter 120, the DBMS compiler 110 may insert a standalone call of the UDF in the query plan 116, such as via a remote procedure call (RPC). When the standalone call is encountered by the execution engine 118 during performance/execution of the query plan 116, the UDF server/interpreter 120 may be invoked. The UDF server/interpreter 120 may load the UDF object from the Metadata and Code Repository 108 and execute the UDF (e.g., the UDF object). Results of executing the UDF are returned to the execution engine 118, where the results may be used in the performance of the query plan 116 and, ultimately, the execution of the query 112. As illustrated, the performance of the query plan 116/execution of the query 112 may retrieve data by accessing a disk process 124, such as DP2 in SQL/MX. The disk process 124 is database process that enables data stored in the database tables to be filtered and/or retrieved by higher level processes (e.g., of the execution engine 118), such as executor server processes (ESPs) that provide parallel processing and/or serial execution processes, such as a root process that provides a gateway back to an application requesting performance of the query 112.

In some instances, the DBMS compiler 110 may target execution of a UDF of the query 112 to the execution engine 118, causing the UDF to be executed by the execution engine 118. This may be particularly beneficial to create added efficiencies in the UDF execution. For example, execution of the UDF via the execution engine 118 may provide wider availability of the UDF for execution within the query plan 116 (e.g., as expression items that may be used by relational operators of the query 112). Further, such execution may allow the UDF to be performed via the efficient parallel processing capabilities of the execution engine 118.

To cause the UDF to be performed/executed via the execution engine 118, the DBMS compiler 110 may use a UDF attachment service 122 (e.g., compiler-executable instructions implementable by the DBMS compiler 110 that are stored within a tangible, non-transitory computer-readable medium) to attach the UDF (e.g., a UDF object) to a component (e.g., relational operator of the query 112) implemented by the execution engine 118. The DBMS compiler 110 may identify characteristics of the UDF to identify a particular location within the query plan 116, where the UDF will be executed. For example, the UDF may be attached to a particular associated relational operator in the query plan 116. To attach the UDF with the relational operator, the UDF may be implemented as a scalar operator of the relational operator within query plan 116, such that the UDF is presented as an item expression for use with the relational operator. In this manner, the UDF may be presented as a database operator, making the UDF a first class citizen/member of the execution engine 118. As used herein, a first class citizen or member status of a UDF refers to the UDF being accessible by (e.g., may be used as arguments by) associated relational operators within the query plan and/or execution engine 118. Thus, because the execution engine 118 is capable of parallel performance/execution of the relational operators, the attachment of the first class citizen UDFs to these relational operators results in the execution engine 118 being capable of parallel performance/execution of the UDFs as well.

The DBMS compiler 110 may restrict certain execution of the UDF by the execution engine 118 depending on the predicted cost of the UDF (e.g., how resource intensive, time intensive, or otherwise constraining the UDF is) and/or other characteristics of the UDF and/or UDF performance/execution. For example, when a UDF is predicted to have a low cost, the UDF may be attached to a relational operator without constraining a location of the UDF and with parallelism within the query plan 116. However, when the UDF object execution is predicted to be expensive, the UDF performance/execution may be restricted to a serial execution and/or restricted from execution at particular locations (e.g., at the disk process 124 or other locations where the UDF performance may be restricted).

Figure 2:
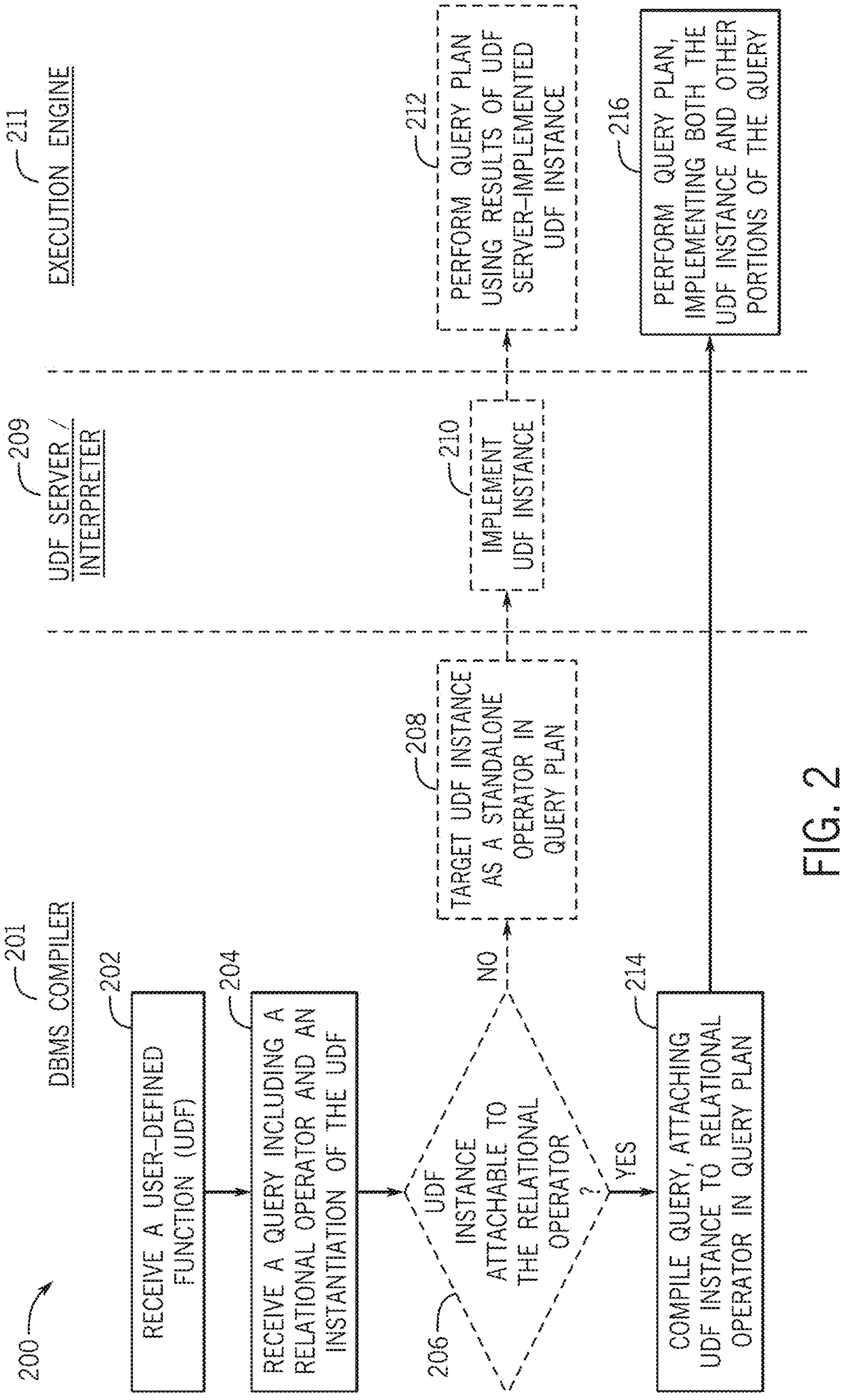
FIG. 2 is a flowchart, illustrating a process for incorporating a UDF instance in a query plan, in accordance with aspects of the present disclosure.

FIG. 2 is a flowchart, illustrating a process 200 for incorporating a UDF instance in a query plan, in accordance with aspects of the present disclosure. A DBMS Compiler 201, such as the DBMS compiler 110 of FIG. 1, may provide compiler operations to facilitate incorporation of a UDF instance into a query plan. As mentioned above, a UDF may be received (block 202). For example, a user, group of users, software, and/or machine may provide a command requesting creation of a function with a specified functionality (e.g., the UDF). The UDF may be written in a procedural language (PL), such as PL/MX, separate from a declarative language (e.g., SQL, XQuery, or other language that describe desired results of execution) supported by the DBMS.

The UDF may provide a general purpose function that is used to support/supplement a database query (e.g., written in the declarative language supported by the DBMS). Thus, a query that includes one or more relational operators and a call (e.g. instantiation) of the UDF may be received (block 204). For example, the UDF can be part of a predicate expression in a table scan, an expression in a having clause for a group-by expression, part of a predicate expression in a join expression, part of the select list of a query, or provided in other computer-interpretable code.

Optionally, certain criteria of the UDF and/or the relational operator may dictate whether a UDF instance is attachable to the relational operator. Thus, optionally, at decision block 206, a determination may be made as to whether the UDF instance is attachable to the relational operator (e.g., based upon this criteria). For example, in some implementations, UDF instances may be attachable when the UDF itself does not include an embedded query/statement (e.g., SQL statements, XQuery statements, or other database query statements) (e.g., the UDF is "inlinable"), but not when the UDF does include such embedded queries/statements (e.g., the UDF is "not inlinable"). Further, the UDF instances may be attachable to a relational operator if the inputs for instantiation of the UDF are available at the relational operator and/or location constraints are met at the relational operator (e.g., the UDF is "covered"), but may not be attachable to a relational operator if the inputs for instantiation of the UDF are not available at the relational operator and/or location constrains are not met at the relational operator (e.g., the UDF is "not covered"). For example, very expensive and/or time consuming UDFs may be constrained from running at a disk process, as the disk process is shared across many operations and excessive execution at the disk process may create processing inefficiencies.

When the UDF is not attachable to the relational operator, the UDF may be targeted/implemented as a standalone operator (block 208). Such standalone operator implementation may include, for example, the DBMS Compiler 201 inserting a standalone call of the UDF in the query plan 116.

This may result in invocation of a UDF server/interpreter 209, such as the UDF server/interpreter 120 of FIG. 1, to implement an instance of the UDF (block 210). Upon implementation of the UDF instance, a result of the UDF instance may be returned to the execution engine 211 (e.g., of the DBMS), such as execution engine 118 of FIG. 1.

The execution engine 211, tasked with DBMS execution of other portions of the query (e.g., analysis of the relational operators), may receive the result of the UDF instance from the UDF server/interpreter 209 and may perform the query plan (e.g., executing other portions of the query plan 116 using the results from the UDF server/interpreter 209 implemented UDF instance) (block 212).

However, when the UDF instance is attachable to the relational operator (e.g., such as by meeting attachment criteria and/or there is no attachment criteria), the UDF instance may be implemented by attaching the UDF instance to the relational operator (block 214). Attaching the UDF instance to the relational operator may include extending an item expression associated with the relational operator to include a scalar operator resulting from execution of the UDF instance within the execution engine 211, such as the execution engine 118 of FIG. 1.

With the UDF instance attached to a relational operator in the query plan, the execution engine 211 may perform the query plan, implementing both the UDF instance and the other portions of the query plan (block 216). Thus, no external UDF server/interpreter 120 is used to execute the UDF instance, but instead, the execution is integrated with the execution of the relational operator in the query plan.

Regardless of whether the execution engine 211 implements the UDF instance (block 216) or the UDF server/interpreter 120 implements the UDF instance (block 210), the results of the executed UDF may support/supplement execution of the query. Thus, the query may be completed using the UDF results, either via receiving the results from the an external process (in the standalone operator implementation) and/or via an item expression accessible by the relational operator within the execution engine (in the attached UDF implementation).

As may be appreciated, multiple UDFs may be implemented in a query plan. In some cases, a portion of the UDFs may be implemented via the attached UDF implementation and a portion of the UDFs may be implemented via the standalone implementation. For example, a first UDF may be implemented via the attached UDF implementation and a second UDF may be implemented via the standalone operator implementation, refraining from targeting the second UDF for implementation by the execution engine.

Figure 3B:
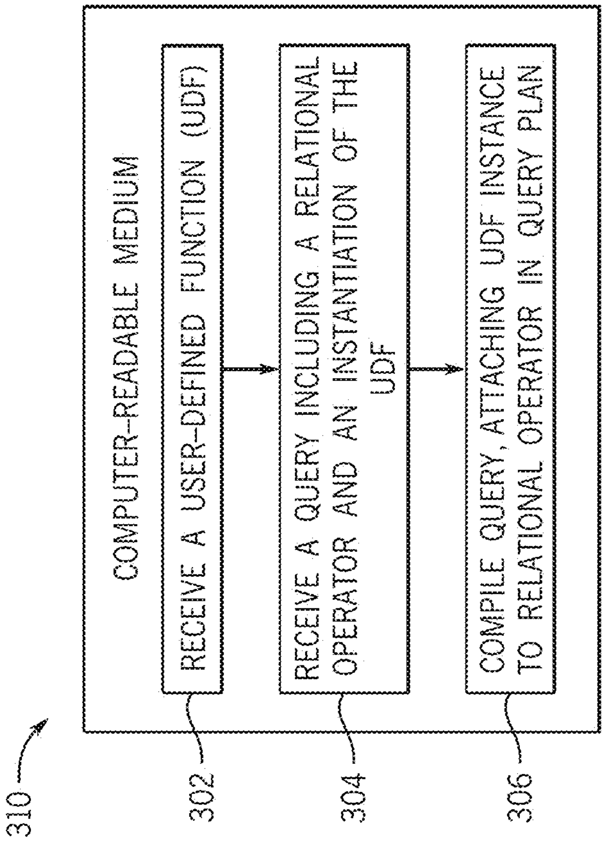
FIG. 3B is a non-transitory computer-readable medium that stores computer-readable instructions that, when executed by one or more processors, cause the one or more processors to perform the process of FIG. 3A, in accordance with aspects of the present disclosure.
Figure 3A:
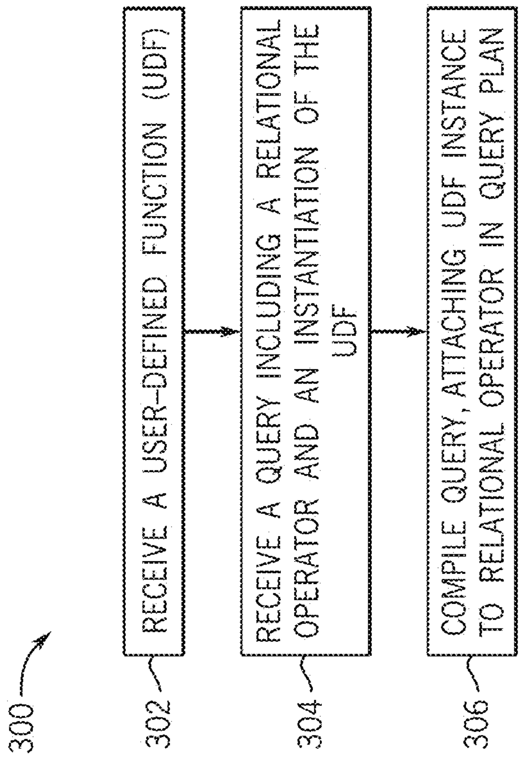
FIG. 3A is a flowchart, illustrating a DBMS Compiler-implemented process for compiling a query with an attached UDF instance, in accordance with aspects of the present disclosure.

FIG. 3A is a flowchart, illustrating a DBMS Compiler-implemented process 300 for compiling a query with an attached UDF instance, in accordance with aspects of the present disclosure. FIG. 3B is a non-transitory computer-readable medium 310 that stores computer-readable instructions that, when executed by one or more processors, cause the one or more processors to perform the process of FIG. 3A, in accordance with aspects of the present disclosure.

The process 300 begins with receiving a UDF (block 302). For example, a user, group of users, software, and/or machine may provide a command requesting creation of a function with a specified functionality, such as in the UDF. The UDF may be written in a procedural language (PL), such as PL/MX, separate from a declarative language supported by the DBMS.

The UDF may provide a general-purpose function that is used to support/supplement a database query (e.g., written in the declarative language supported by the DBMS). Thus, a query that includes one or more relational operators and a call/instantiation of the UDF may be received (block 304). For example, the UDF can be part of a predicate expression in a table scan, an expression in a having clause for a group-by expression, part of a predicate expression in a join expression, and/or part of the select list of a query.

The UDF instance may be implemented/compiled by attaching the UDF instance to the relational operator (block 306). Attaching the UDF instance to the relational operator may include extending an item expression associated with the relational operator to include a scalar operator resulting from execution of the UDF instance within the execution engine.

Figure 4B:
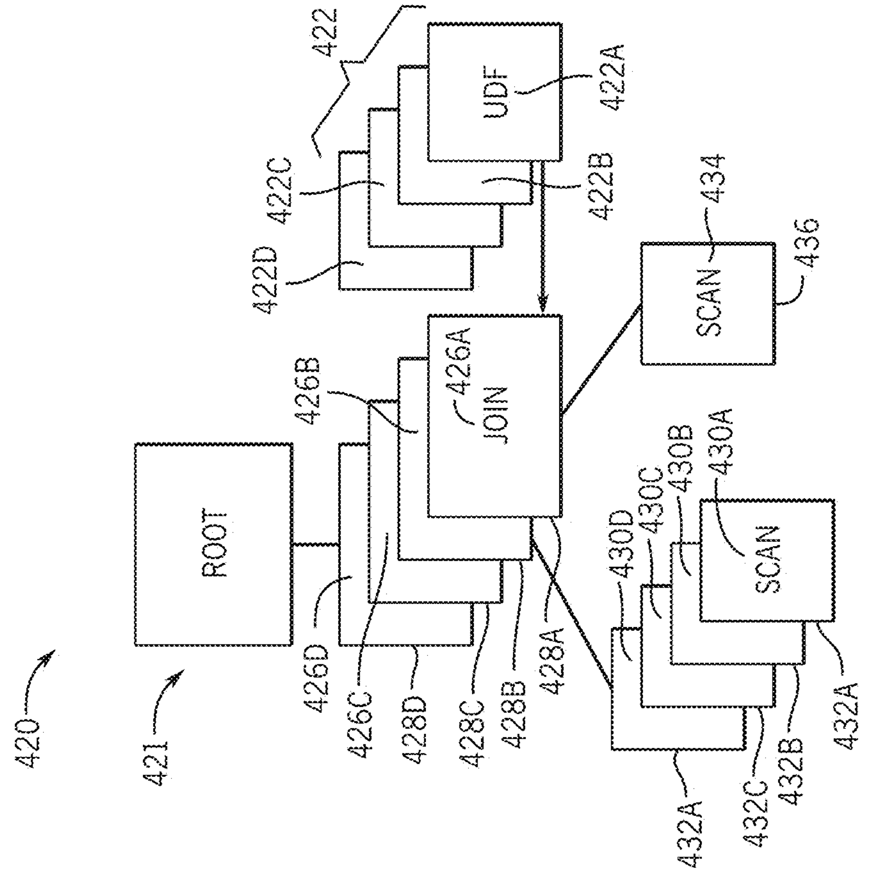
FIG. 4B is a diagram, illustrating an example attachment of UDF instances to relational operators in a query plan that provides parallel execution, in accordance with aspects of the present disclosure.
Figure 4A:
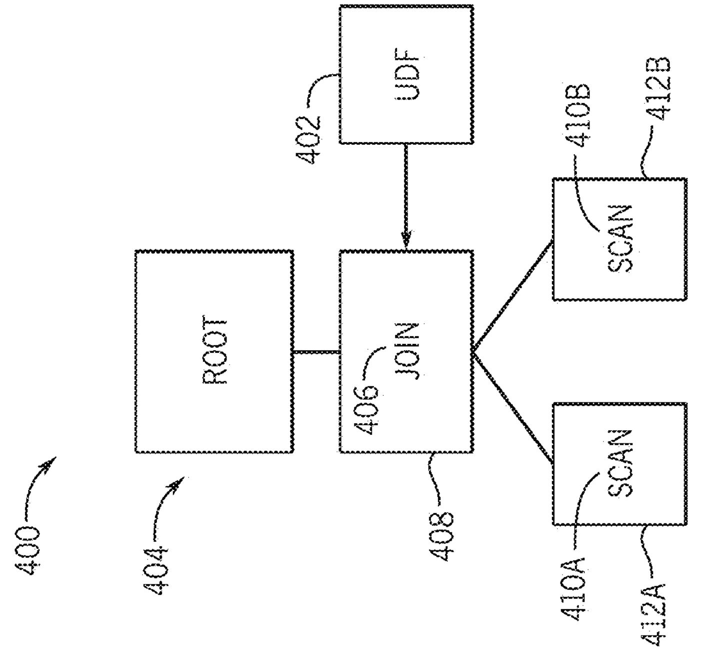
FIG. 4A is a diagram, illustrating an example attachment of a UDF instance to a relational operator within a query plan, in accordance with aspects of the present disclosure.

FIGS. 4A and 4B are diagrams illustrating attachment of a UDF to a relational operator within a query plan. Starting first with a serial UDF implementation, FIG. 4A is a diagram, illustrating an example of a query plan 400 with attachment of a UDF instance 402 within an serial (e.g., non-parallel) query plan, in accordance with aspects of the present disclosure. As illustrated, queries and their associated query plans may include many different relational operators, running in different processes. Here, for example, the query plan 400 is generated to execute at an application coordinator (e.g., root) node 404. The child nodes from the application coordinator node 404 include the relational operators of a corresponding query being implemented by the query plan 400. For example, here the relational operators include a "JOIN" relational operator node 406 within an executor server process (ESP) 408. Further, the relational operators include "SCAN" operation nodes 410A and 410B executing within disk processes 412A and 412B, respectively.

As illustrated, the UDF 402 (e.g., an instantiated UDF instance) may be attached/coupled to a relational operator within the query plan 400. The attachment may be based upon an association between the UDF 402 and a particular relational operator. For example, here, the UDF 402 may be associated with the "JOIN" relational operator of the "JOIN" relational operator node 406, such as by being a predicate of the "JOIN" relational operator. Accordingly, the UDF 402 is attached to the "JOIN" relational operator node 406 at the ESP 408.

By attaching UDFs to relational operators within a query plan, the DBMS may be extended to support parallel execution of the UDFs, resulting in significant processing efficiencies. For example, in a relational DBMS (e.g., SQL/MX, My SQL, Oracle Database, or other database that stores and organizes data in tables with pre-defined relationships), the DBMS may be extended to support row parallelism with other relational operators, resulting in improved efficiencies through parallel processing. Parallel processing may be provided at a server process level and/or a disk process level, depending on implementation. FIG. 4B is a diagram, illustrating an example of a query plan 420 with attachment of parallelly executed UDFs 422A-D (e.g., instantiated UDF instances) to parallelly executed relational operators in a query plan, in accordance with aspects of the present disclosure.

As with the query plan 400 of FIG. 4A, the query plan 420 includes a particular application coordinator (e.g., root, parent, or other node) 421 node where execution of the query plan occurs. The child nodes from the application coordinator 421 include the relational operators of a corresponding query being implemented by the query plan 420. Similar to the query plan 400, the relational operators include "JOIN" and "SCAN" relational operators. However, the query plan 420 implements parallel processing of the "JOIN" relational operator, creating a plurality of "JOIN" relational operator nodes 426A-D executing within corresponding ESPs 428A-D. Because the execution engine is able to execute the relational operators in parallel, the execution engine is also able to execute UDFs attached to these relational operators in parallel. As with the query plan 400 of FIG. 4A, the UDFs 422A-D (e.g., parallel implementations of a UDF 422) may be attached to a relational operator nodes 426A-D based upon an association between the UDF 422 and the "JOIN" relational operator of the relational operator nodes 426A-D. Thus, the UDFs 422A-D are attached to the "JOIN" relational operator nodes 426A-D at the ESPs 428A-D, respectively. In this manner, the UDFs 422A-D may be performed in parallel execution at each of the attached parallelly executed relational operations, providing significant processing efficiencies.

The parallel relational operators and their attached UDFs may receive data from child relational operators, whether serially executed or executed in parallel. For example, here, the relational operators of the query plan 420 include "SCAN" relational operator nodes 430A-D, executing in parallel within one or more disk processes 432A-D and a "SCAN" relational operator node 434 running serially in a disk process 436. Each of the relational operator nodes 430A-D may act on a particular subset of database data (e.g., a subset of rows) with results being provided to a corresponding parent node of the relational operator nodes 430A-D. Further, because the relational operator node 434 is serially executed, the results of execution this relational operator node 434 may be broadcasted to each of the parent relational operator nodes 436A-D.

Turning now to a discussion of UDF placement, UDF placement within a query plan may impact performance. Placing execution of a UDF within a disk process, for example, may result in faster execution of the UDF and/or query using the UDF, but may, in some cases, impact other processing, as the disk process may be shared among different higher-level processes.

Figure 5:
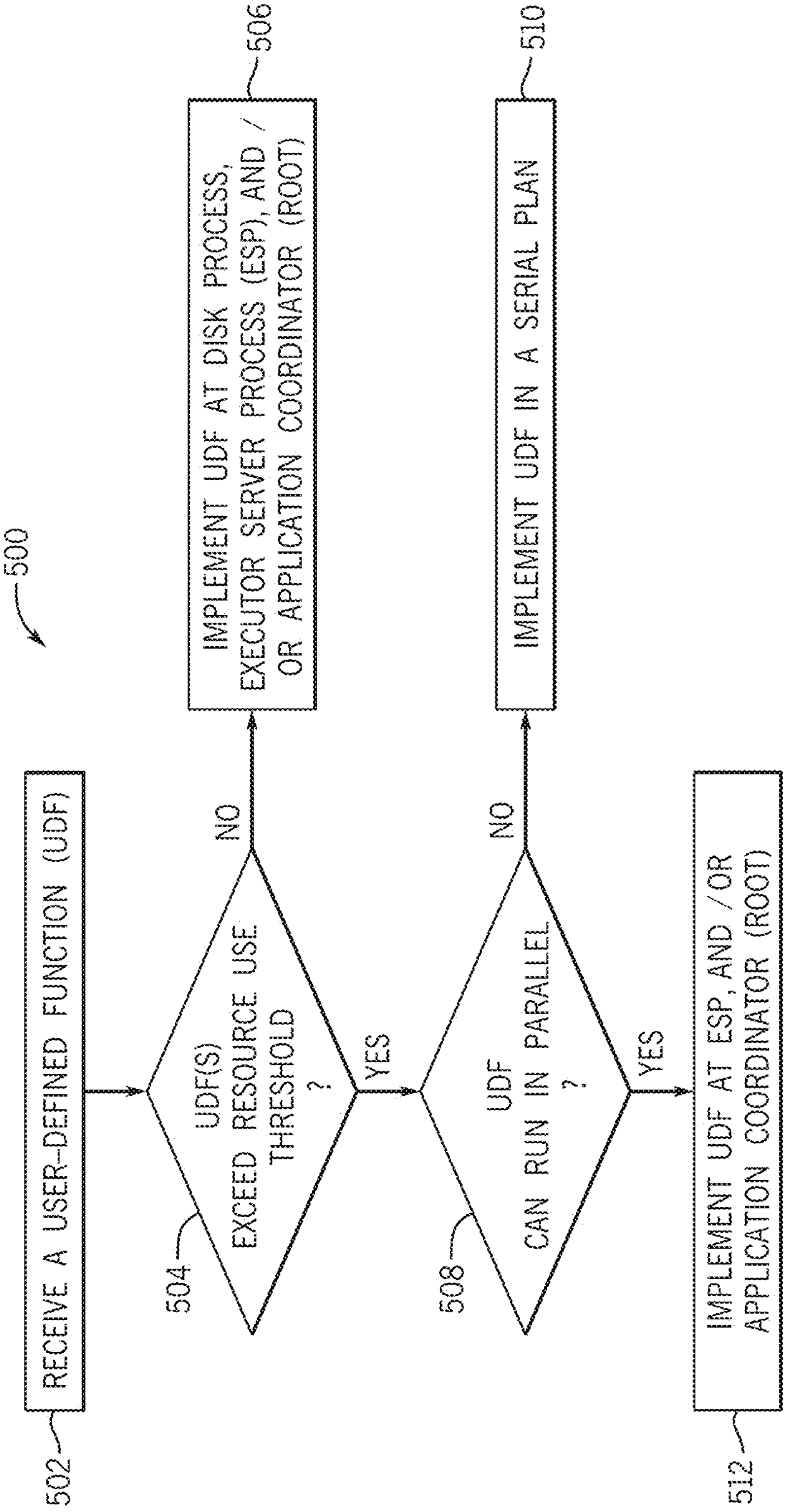
FIG. 5 is a flowchart, illustrating a process for identifying a UDF implementation location within a query plan, in accordance with aspects of the present disclosure.

FIG. 5 is a flowchart, illustrating a process 500 for identifying a UDF implementation location within a query plan, in accordance with aspects of the present disclosure. The process 500 begins with receiving a UDF to be placed in the query plan (block 502). For example, a UDF creation command may be provided, resulting in a UDF (e.g., UDF object) being compiled and received at a DBMS compiler for implementation in a query plan.

A determination is made as to whether the UDF exceeds one or more resource use threshold(s) (decision block 504). The resource use threshold(s) may dictate particular characteristics of the UDF that indicate that the UDF should be constrained from parallel execution and/or execution within particular processes and/or process locations (e.g., because the particular characteristics may indicate that the UDF may use more resources than desirable for placement within certain processes. For example, an estimated processor utilization, estimated memory utilization, or other predicted resource utilization may be identified based upon the UDF's characteristics and compared to the resource use threshold(s), which may indicate an allowed central processing unit (CPU) time (e.g., a processor utilization threshold), an allowed memory consumption (e.g., a memory utilization threshold), or other allowed resource utilization during execution of the UDF.

In some instances, the resource use threshold(s) may indicate a particular number of allowed instances of the particular characteristics of the UDF. For example, the resource use threshold(s) may specify a number (e.g., 0-N) of allowed particular components within a UDF, such as: DBMS knobs (query execution configuration affordances), loops, nested loops, binary large objects (BLOBs), character large objects (CLOBs), associative arrays, parameters, or other potentially resource intensive characteristics. Further, the resource use threshold(s) may indicate a threshold size of the UDF (e.g., a number of lines of code, a number of bytes of the UDF code (e.g., 4 k Bytes) (e.g., a UDF size allowance threshold), or other size criteria.

Additionally, when the UDF is used as a predicate for a relational operator, (e.g., a filter based upon evaluation of the UDF to True or False) within a query, the selectivity (e.g., amount of filtering provided by the predicate) may indicate whether a filtering threshold is met. For example, a filtering threshold (e.g., 20% of a dataset) may be used as a resource use threshold, such that UDFs that filtering less than the filtering threshold may indicate to constrain the UDF from execution in particular process and/or process locations (e.g., within a disk process).

Further, execution of other UDFs may impact resource use. Accordingly, the resource use threshold(s) may also account for a cumulative number of UDFs pushed to a particular process (e.g., a disk process or other monitored process) (e.g., a threshold number of allowed UDF executions), restricting UDF placement at a particular process when a threshold number of UDFs (e.g., indicated by the resource use threshold) have already been placed at this process.

In some instances, a predicted resource use of the UDF may be provided in a single score and the resource use threshold(s) may be implemented as a threshold value of that score. In some instances, the resource use threshold(s) may be implemented as individual characteristic thresholds for individual characteristics of the UDF.

If the UDF does not breach the resource use threshold(s), the UDF's placement location may be unconstrained. Thus the UDF may be permitted to be placed at a disk process, executor server process (ESP), and/or at an application coordinator process (e.g., root, parent, or another node) where the relational operator the UDF is to be attached to is located (block 506).

However, when the UDF breaches the resource use threshold(s), the UDF's execution (e.g., placement and/or parallel execution) may be constrained. For example, the UDF may be constrained from execution within a disk process.

Further, a determination is made as to whether the UDF can run in parallel (decision block 508). Parallel implementation may be limited based upon a number of characteristics of the UDF and/or query execution. For example, the UDF may be constrained from parallel execution based upon inputs for the UDF not being available for such parallel implementation. Further, certain relational operator constraints may constrain the UDF from parallel execution. For example, a user selectively provide an indication (e.g., via an application graphical user interface (GUI) to constrain UDFs from parallel execution when attached to "Groupby" relational operators). Accordingly, when such attachments are found in the query plan, the attached UDFs may be constrained from parallel execution. When the UDF is constrained from parallel execution, the UDF is implemented in a serial plan (block 510), such as the query plan 400 of FIG. 4.

However, when the UDF's resource use breaches the resource use threshold(s) (decision block 504) but the UDF can run in parallel (decision block 508), the UDF may be executed in parallel, but the execution is constrained to particular locations, such as in an ESP and/or application coordinator (e.g., root) process that is less resource-dependent (block 512). For example, as explained above, because disk processes are shared processes, UDF execution at these processes may be constrained while not at other processes and/or process locations (e.g., processes outside of disk process, such as at an ESP process and/or the application coordinator (e.g., root) process).

As may be appreciated, the techniques provided herein may provide significant execution efficiencies with respect to database query execution. Capabilities of the parallel database system may be leveraged to provide parallel execution of UDFs, resulting in significant processing efficiencies. Further, UDFs may become first class citizens of the database, enabling ease of access and use in database querying. Many use cases for this improvement may be appreciated. Indeed, in some cases, artificial intelligence (AI) models may be invoked directly by an execution engine, indirectly via a remote process called in a remote procedure call (RPC), or both, by encapsulating weights of an (AI) model in a UDF.

Figure 6:
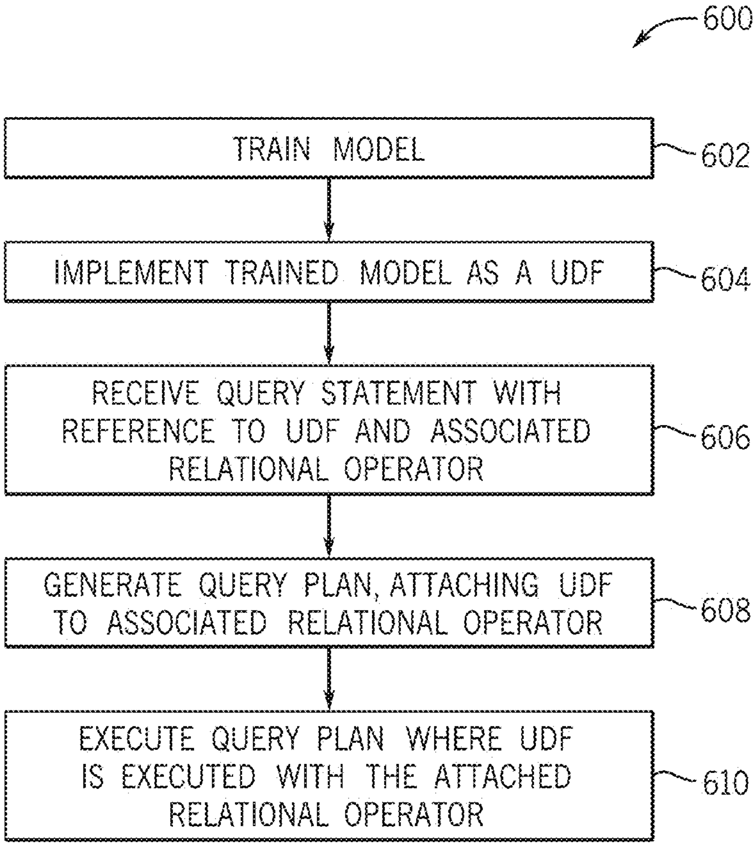
FIG. 6 is a flowchart, illustrating a process for implementing computer modelling via a UDF attached to a relational operator, in accordance with aspects of the present disclosure.

FIG. 6 is a flowchart, illustrating a process 600 for implementing computer modelling via a UDF attached to a relational operator, in accordance with aspects of the present disclosure. The process 600 begins with training a model (block 602). The training may include providing a training dataset including both sample output data and corresponding input data that influences the output data. The training dataset finds correlations between the input data and the output data to derive how to make subsequent decisions regarding subsequent input data.

The trained model may be implemented as a UDF (block 604). For example, UDFs may be implemented in a procedural language, such as PL/MX. The UDFs may implement the trained model, by applying weights (e.g., derived from weighted variables identified by the trained model) to UDF parameters to derive a UDF output that is a function of the trained model's weighted variables.

As described in the process 200 of FIG. 2, a query statement referencing the UDF and an associated relational operator may be generated and received (block 606). The query statement may provide source data and/or an indication of a location (e.g., table and/or columns of a table) where source data may be obtained. As may be appreciated, the source data may be provided as parameters to the UDF, enabling the UDF to apply the trained model's weighted variables to the source data.

As discussed above, a query plan that attaches the UDF to the relational operator may be generated (block 608). The UDF may be associated with the relational operator, such as by acting as a predicate and/or other expression used by the relational operator.

The attachment of the UDF to the relational operator enables the execution engine to execute/perform the UDF (e.g., with the parallel capabilities of the execution engine). Thus, the query plan may be executed (e.g., by the execution engine), resulting in execution/performance of the UDF with the attached relational operator (block 610). Accordingly, the source data provided as a parameter of the UDF is applied to the weights provided in the UDF to generate a trained model output.

FIG. 7 provides an illustrative example implementation 700 of the process 600 of FIG. 6 to provide class inference (e.g., classification of an unclassified query), in accordance with aspects of the present disclosure. Inference of a query's membership within a particular class of queries is useful in many different artificial intelligence (AI)/machine learning (ML) analytics implementations. Using the techniques provided herein, such inference of class membership may be implemented within the DBMS/database via an efficient UDF that is a first class citizen of the database. In the manner, the class inference function may be provided as a primitive for relational operators, which may be beneficial in the domains of image processing, natural language processing, computer vision, neural networks, and other fields using class inference.

The class inference function is tasked with classifying a query's runtime behavior into one of a set of classes based upon compile time data of the query. In one example, the classes include: C1: queries that run in less than 3 microseconds, C2: queries that run in less than a minute, and C3: queries that run in a minute or more.

As mentioned above, a model may be trained. For example, for class inference, a decision tree model may be trained with training data 702 derived by modifying a database compiler to emit useful features that may impact runtime performance. For example, tot_to_proc in training data 702, stored in a Table T1, is a compiler computed representation of a summation in bytes of all tuples processed by scan operators of a query.

In the provided example, the decision tree model is trained using a workload of a random subset of about 1200 queries from about 2000 database queries. Random selections of the remaining approximately 800 queries are used as test data sets to understand the accuracy of the model.

Thus, as illustrated, a resulting trained model 704 is generated. Here the trained model 704 (e.g., a trained query classification model) is regression tree model represented in R-language, however other modelling representations may be used. In some cases, the trained model 704 may be compressed using a principle component analysis (PCA), reducing the number of dimensions/rows (e.g., 25) to a fewer number (e.g., 8) of principle dimensions (e.g., the most influential dimensions in determining class membership). In other cases, the trained model 704 may be used in a uncompressed state.

The trained model may be implemented as a UDF 706. Here, a PL/MX UDF is generated from the trained model 704. As may be appreciated, each path of the regression tree is implemented by conditional statements based upon the weighted principle components from the trained model 704. The leaves of the trained model 704 (represented by an ending "*" in the trained model 704) are implemented as return values of UDF 706 indicative of an ascribed class. The comments provided in the UDF 706 (e.g., represented between/* */) indicate a corresponding line of the trained model 704.

A database query statement 708 having a reference to the UDF 706 and associated relational operator (e.g., "Select") may be received. The UDF 706 and the relational operator may be attached to each other for implementation in the query plan. Statistics with respect to queries to be classified may be extracted from the DBMS compiler and stored as components (e.g., principle components PC1-PC8) in Table T1. The query statement 708 includes parameters 710 and data source 712, specifying the principle components PC1-PC8 as parameters and Table T1 as the data source for the UDF 706.

The query plan is executed, resulting in execution of the UDF 706 using parameters PC1-PC8 of the UDF obtained from Table T1, as specified in the query statement 708. The UDF returns a UDF value 714 (e.g., here a class result), thus providing a classification for the query having principle components PC1-PC8.

Figure 8:
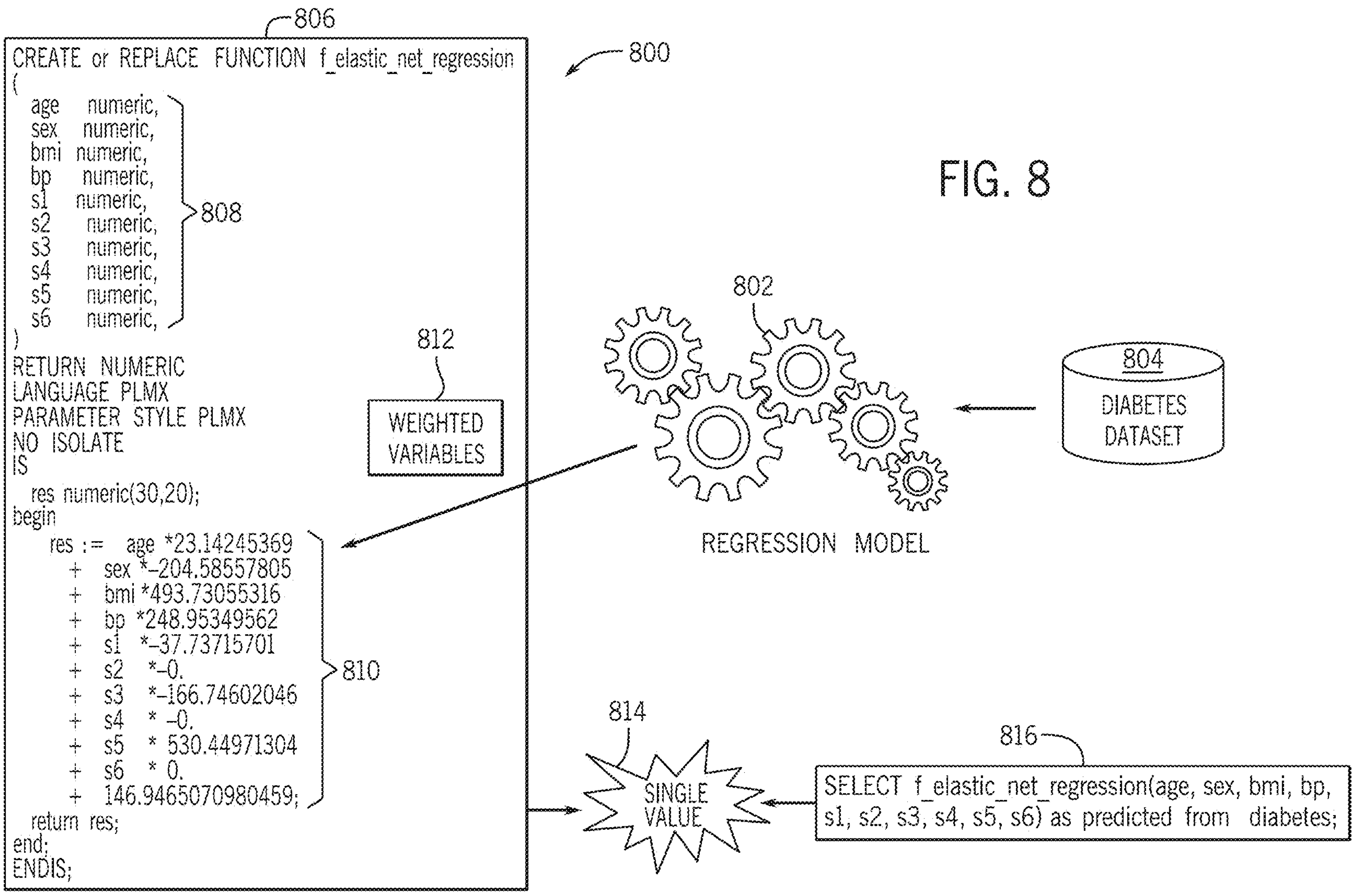
FIG. 8 is a diagram, illustrating a linear regression model implemented via a linear regression UDF execution, in accordance with aspects of the present disclosure.
Figure 9:
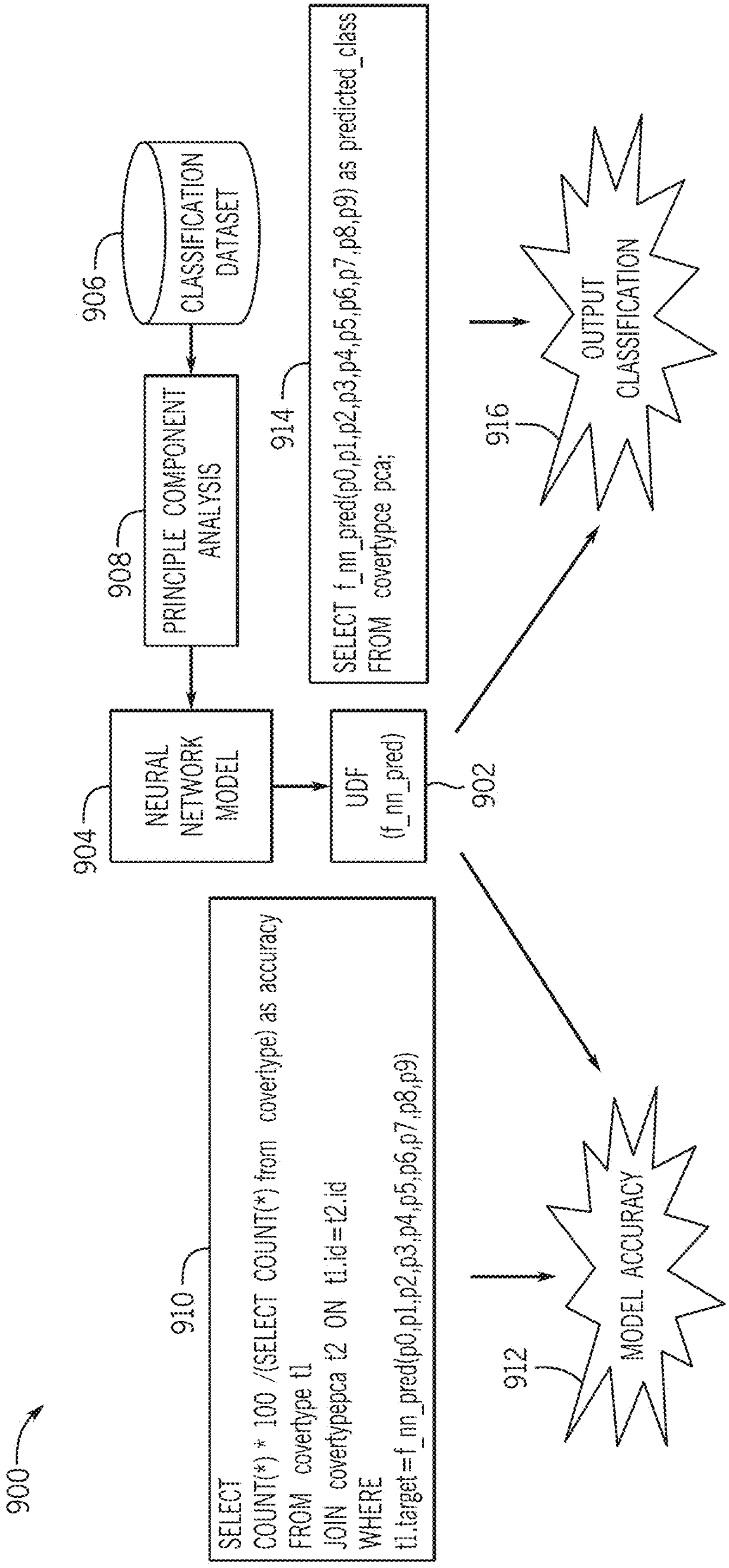
FIG. 9 is a diagram, illustrating an example UDF execution that performs classification using a neural network, in accordance with aspects of the present disclosure.

Many different computer modelling functions may be employed via the techniques provided herein. FIGS. 8 and 9 provide examples of computer modelling implemented via the system 100 of FIG. 1 and processes 200, 500, and 600 of FIGS. 2, 5, and 6, respectively.

FIG. 8 illustrates a linear regression model implemented via a linear regression UDF 800, in accordance with aspects of the present disclosure. In the example 800 of FIG. 8, an Elastic Net Linear Regression model 802 is trained on a diabetes dataset 804. A regression model is a statistical model that uses a line or plane to estimate a relationship between independent and dependent variables. An elastic net linear regression uses penalties from both lasso and ridge techniques applied to the regression model to regularize the regression model.

Ten variables (age, sex, body mass index (bmi), blood pressure (bp), and six blood serum measurements (s1-s6)) are used to describe a person's health. A UDF 806 implementing the model 802 is tasked with returning a predicted single value (here labelled "res") that measures disease progression after one year based upon the ten variables inputted as parameters 808. As illustrated, in UDF portion 810, weight variables 812 from the trained Elastic Net Linear Regression model 802 are applied as weighting of the parameters 808, with a summation of the weighted parameters being returned as the predicted single value 814.

Using the techniques described herein in, the linear regression UDF 806 may be implemented as a first class citizen of the database, executable by the DBMS execution engine. For example, a query statement 816 that provides "SELECT f_elastic_net_regression (age, sex, bmi, bp, s1, s2, s3, s4, s5, s6) as predicted from diabetes;" may cause the execution of the UDF 806 by the DBMS execution engine, specifically accessing the 10 parameters from a table named diabetes and returning the single value 814 in a variable named "predicted."

FIG. 9 illustrates an example 900 where a UDF 902 performs classification using weights of a neural network 904, in accordance with aspects of the present disclosure. In the illustrated example, an original classification dataset 906 contains 54 features, describing 30 m×30 m patches of forest. The target classification variable is the cover type of the forest, where there are multiple possible classes (e.g., 7 possible classes). Before training, PCA dimensionality reduction 908 is performed on the original classification dataset 906 to reduce the original classification dataset 906 to 10 features, instead of 54. The neural network 904 is then trained. The neural network 904 may be a trained multi-layer neural network that has an input layer, a hidden layer (e.g., with 16 nodes), and an output layer, where the model is a fully connected feed forward network. The neural network may use a rectified linear unit (ReLu) activation function (e.g., in the hidden layer) to add non-linearity to the model and a softmax (e.g., in the output layer) for class prediction in the final output.

A UDF 902 (here named: "f_nn_pred") is written to take 10 input parameters and output the predicted class. The weights of the model are stored in VARRAY objects. An example code implementation of this UDF 902 is provided below, with comments detailing particular implemented actions of the UDF 902:

```
CREATE or replace FUNCTION f_nn_pred
(
  p0 float, p1 float, p2 float, p3 float, p4 float,
  p5 float, p6 float, p7 float, p8 float, p9 float
)
RETURN INT
LANGUAGE PLMX
PARAMETER STYLE PLMX
NO ISOLATE
IS
   TYPE arr_float is VARRAY(16) of FLOAT;
```

-continued

```
TYPE arr_2D is VARRAY(16) of arr_float; -- Max is number of nodes in layer
TYPE arr_3D is VARRAY(2) of arr_2D; -- Max is number of layers − 1
n_layers INT := 3;
n_nodes INT;
layer arr_float := arr_float(p0,p1,p2,p3,p4,p5,p6,p7,p8,p9); -- Initialize as input layer
input_dim INT;
output_layer arr_float;
w FLOAT;
softmax_d FLOAT := 0;
max_score FLOAT := 0;
max_idx INT := 0;
-- Store Model Weights
weights arr_3D := arr_3D(
arr_2D(
    arr_float(−0.9044905887160666, 0.3483218793245088, −0.5202080436641121,
0.49115222281511967, −0.5404661206604217, −0.5818618129005811,
−0.46184415695526493, 0.16391054903559943, 0.32042867179791934,
−0.23909186929864673, −0.031024999791481826, −0.02171717924024868,
0.47488129673777, −0.4928847676240805, 0.4186135799155066,
−0.21220376459846715),
    arr_float(0.12236560237788241, 0.09971546506070596, 0.3450490591276189,
0.10671015055627332, −0.21606607945909193, −0.6930127062561027,
−0.8400928030946812, −0.7421998007275349, 0.23058120184977965,
−0.038747673660676, −0.46791166231429193, −0.11298084139013824,
1.0183150547842033, −0.1643703280698221, 0.0597922734775381,
0.29538515818014477),
    arr_float(0.40674570891695294, −0.0626167180252825, 0.3873463971403007,
−0.10672279038351909, −0.05167907769509496, −0.8857501540156278,
−0.5070871778792346, −0.6530396258194133, 0.04347696574551944,
−0.46641965639579225, −0.21868665688791267, 0.2227601878586791,
0.3526421522900155, −0.34692462410391145, 0.337661780383139,
0.028443770454163065),
    arr_float(0.5344211191510182, −0.5433410744858196, 0.4989260932314499,
0.5383348273086793, −0.2741273825103024, −0.6462877124468811,
0.36326926293486167, −0.3786190815232698, −0.191927854580447,
−0.09324557169727149, 0.05995957440988201, −0.35227827223887825,
0.3892429231515432, 0.46396023659985475, −0.744965310730846,
0.4436635255553834),
    arr_float(−0.9822281278071558, 0.30160068078777413, 0.7358834599997406,
−1.2684297620008458, −0.9764688708958154, −0.030828711965978636,
0.7591687251576911, 0.4864568408311193, −1.4393517606974509,
0.589633020491257, 0.8732151028042429, −0.28261252347866495,
−1.2755871429690309, −0.45691647925259204, −1.1178989470742249,
0.03460657048433933),
    arr_float(−0.07393514990007327, −0.33355417869357595,
0.6685127172678089, −0.472773675112704, −0.29424872974392113,
−0.33879549549405324, −0.3673526887019335, 0.1524180017017502,
0.2786094494827115, −0.20967831870360476, −0.46614582883272043,
−0.010358336319715248, 0.526179473837268, −0.14411828858003314,
0.0029161018584778877, −0.07855121284803569),
    arr_float(0.5516362266325626, −1.3570462390356608,
0.008197873860802202, −0.08132968991486515, 0.10526467228349111,
−0.3919416773135868, 0.6080015125735486, −0.07074655150841486,
0.6668607820911515, −0.6719644547263014, 0.133926766051279,
0.016985961133685154, 0.40557120188251283, −0.03689377454538774,
−0.26158219704246455, 0.7777329061099795),
    arr_float(−0.42661387864566935, −0.06869630126983287,
0.14667828612621112, 0.7945222090893969, −0.504167579071051,
0.03711147651343978, −0.19126917611775007, 0.6684485941131296,
−0.24747709577161087, −0.5037386848904176, 0.017288678792933138,
−0.1641260539707655, −0.48253155078505333, 0.34211349580496436,
0.38421850738257324, 0.11137065662406659),
    arr_float(−0.2580780750882281, 0.2497569031687423, 0.01848971047562496,
0.2178821853303132, 1.0619182532871807, 0.06792215754353087,
0.14260789339399715, −0.4886782094453, 0.9882592691492267,
0.490146847670339, −0.6013216666023599, −0.07386343280980519,
−0.5604330288398754, −0.017139340787677555, −0.02161520384429988,
0.13954342649361914),
    arr_float(0.38390580316702844, 0.6358692066758833,
−0.07579232894593071, 0.055459439365233225, 1.0305316367455122,
−0.6486231310361985, −0.1282109016479702, 0.30006899136146964,
−0.614797111683631, −0.43798648242892285, 0.23564621373482886,
0.2536438323039988, 0.43737543321120465, 1.3144062451076786,
0.3097061780676176, −0.5774837567527776)),
arr_2D(
    arr_float(0.12501682336371575, 0.8511581882212282, −0.6208288734633232,
−0.35098932115506776, −0.5278086426045087, −1.9479420758619008,
−0.23986130605298792),
    arr_float(0.18863887337514187, 0.37061895069963713,
```

-continued

```
−0.33163388429976975, 0.15912220372710276, −0.1365523528696236,
0.33060955224373617, −1.6675278955466524),
      arr_float(0.05686417305861694, 0.320984873375485, −0.3543275697302911,
−0.8582339944880624, −0.6648658219660155, −0.11801272676688519,
−0.831425616863),
      arr_float(−0.002327163017092781, 0.19000658190172415,
0.4169458270494263, −1.5551276423228875, −0.23134422135063223,
0.10592511415534822, −0.599771858620137),
      arr_float(−0.31312924183674595, −0.12233863334184425,
0.7305210282712402, −1.3645910413851245, 0.061595025588663685,
0.031908508733855735, 1.5101621277931894),
      arr_float(0.2773292880654452, −0.42843493672907407, 0.1356825548824505,
−1.4442242191831534, −0.5002797817804131, −0.4639095086141327,
0.9761633737494398),
      arr_float(0.38916956208021475, −0.16843813923277764,
−1.2395753678140247, −0.7484471405098653, −1.0833935747808772,
−0.23097635198282335, 1.1018284579956816),
      arr_float(0.1661318311807577, 0.7438500087150922, −0.08945503596024838,
−0.9618651576107458, −0.11792130626439984, −0.8499673762625914,
0.1195532910256236),
      arr_float(−0.1521354960384162, 0.6373335076307926, 0.2814603627530979,
0.0746915528402028, 0.41652163585258317, 0.4900810331407174,
−1.4804085547702361),
      arr_float(0.0025098663585796438, 0.3501011424983301,
−0.9957846006672239, −2.2690778296210414, 0.6694729169687036,
−1.2817024134580886, 0.22193968666089883),
      arr_float(0.47301192480163673, 0.08897684010902959,
−1.3169398056029604, −1.4897234370769454, −0.4115177100165859,
0.1651655853331248, 0.6691320872431373),
      arr_float(0.6801327632300717, 0.24720890480817226, −0.8369879947402886,
−0.8607899604588632, 0.31284119977541586, −0.5367865466253327,
−0.28699962157531456),
      arr_float(−1.0331654478754355, −0.32458646836121563, 0.9836279340153214,
0.8187785203505017, −0.3835865645957154, 0.34767424463405644,
−0.7535370914608059),
      arr_float(0.23139124124140448, −0.4775822451038978, −1.2180655844359893,
−0.3876852417422377, 0.4131537258310522, −0.7190677655307696,
0.6709710741947559),
      arr_float(−0.4191945191304486, −0.2171332168469712, 0.8771309653667162,
1.195738181648735, 0.2330109785143967, 0.8166371586166821,
−1.286787666418429),
      arr_float(0.6013873561582659, −0.5973768157791547, −0.7176095427851031,
0.18375875149958473, 0.45345637924477517, −0.009059984758182336,
−0.02401075673471881)));
  intercepts arr_2D := arr_2D(
      arr_float(−0.037765539193481155, 1.0411488442650227,
1.3498362207153867, 0.20843093151453143, −0.4714249164392116,
0.05711982129514952, 0.4238499071724005, 0.31669282979171176,
0.6869618156869557, 0.5506914587867596, 1.1701456794175682,
1.5139186745294122, −0.10779736189005809, 0.047549623146621756,
−0.8106956728675654, 0.13877122977133866),
      arr_float(0.21850470723286486, 0.285927803374449, −0.8907290357763764,
0.014301123266866606, 0.20744418291640393, −0.48085746793499995,
−0.568183025994781));
begin
  FOR n_layer in 1 .. (n_layers−1) LOOP
      input_dim := weights(n_layer).count( );
      n_nodes := weights(n_layer)(1).count( );
      output_layer := arr_float(0);
      output_layer.extend(n_nodes−1,1);
      -- Compute Dot Product
      FOR i in 1 .. input_dim LOOP
        FOR j in 1 .. n_nodes LOOP
          w := weights(n_layer)(i)(j);
          output_layer(j) := output_layer(j) + layer(i) * w;
        END LOOP;
      END LOOP;
      -- Add Intercepts
      FOR j in 1 .. n_nodes LOOP
        output_layer(j) := output_layer(j) + intercepts(n_layer)(j);
      END LOOP;
      layer := output_layer;
      -- Activation Function RELU
      IF n_layer != (n_layers − 1) THEN
        FOR i in 1 .. layer.count( ) LOOP
          IF layer(i) < 0 THEN
            layer(i) := 0;
          END IF;
      END LOOP;
```

-continued

```
  END IF;
END LOOP;
-- Implement Softmax
for i in 1 .. layer.count( ) LOOP
    softmax_d := softmax_d + EXP(layer(i)); -- Sum of exponentials in output
END LOOP;
for i in 1 .. layer.count( ) LOOP
    w := (EXP(layer(i)) / softmax_d);
    IF i=1 THEN
      max_score := w;
      max_idx := i;
    ELSE
      IF w > max_score THEN
        max_score := w;
        max_idx := i; END IF;
      END IF;
END LOOP:
    return max_idx;
end;
ENDIS;
```

Assuming that the original classification dataset 906 is in a table called covertype and the reduced data is in a table called covertypepca. the database query 910 may be used to invoke the neural network 904 to return accuracy 912 of classification performed by the neural network 904. Specifically, a ratio of a number of records of the reduced dataset where the UDF matches the original dataset to a number of records in the original data set is calculated and returned as an accuracy indication of the classification performed by the neural network 904.

Further, to call the UDF 902 on the data in the table, the query statement 914 can be executed. This results in an output classification 916 in a variable named predicted_class.

As may be appreciated, the techniques provided herein offer significant enhancements to UDF processing/execution. In particular, UDFs may be attached to associated relational operators in the query plan enabling, among other things, first class citizenship of the UDF and execution by the DBMS execution engine.

While certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
- a database management system (DBMS) compiler comprising computer-implementable instructions that are implemented by a processor to:
  - receive a user-defined function (UDF);
  - receive a query comprising:
    - a relational operator; and
    - an indication of the UDF associated with the relational operator;
  - compile the query, by attaching an instance of the UDF to the relational operator in a query plan indicating an execution order of components of the query by implementing the instance of the UDF as a scalar operator of the relational operator within the query plan based on one or more inputs of the instance of the UDF being available at the relational operator; and
  - provide the query plan with the attached instance of the UDF to an execution engine to cause a direct implementation of both the instance of the UDF and the relational operator by the execution engine in accordance with the query plan.

2. The system of claim 1, comprising: the execution engine, wherein the execution engine is configured to perform the query plan by implementing both the instance of the UDF and the relational operator in accordance with the query plan, without implementation of the instance of the UDF by a UDF interpreter.

3. The system of claim 2, wherein the query plan comprises an indication to implement:
- a plurality of portions of implementation of the relational operator in parallel; and
- a plurality of instances of the UDF in parallel.

4. The system of claim 2, wherein:
- the DBMS compiler is configured to:
  - receive a second UDF;
  - target a standalone implementation of an instance of the second UDF, by implementing the instance of the second UDF by a UDF interpreter separate from the execution engine; and
- the system comprises the UDF interpreter, configured to:
  - implement the instance of the second UDF; and
  - provide data resulting from implementing the instance of the second UDF to the execution engine.

5. The system of claim 4, wherein the DBMS compiler is configured to target the standalone implementation of the instance of the second UDF in response to at least one of:
- identifying that the second UDF includes an embedded query;
- identifying that an input of the second UDF is not available at the relational operator in the query plan;
- identifying a number of a particular component type exceeds a threshold allowance; or
- identifying that a locational constraint of the UDF is not met by the relational operator.

6. The system of claim 5, wherein:
- the DBMS compiler is configured to target the standalone implementation of the instance of the second UDF in response to identifying that the locational constraint of the second UDF is not met by the relational operator; and
- wherein the DBMS compiler is configured to identify the locational constraint of the second UDF as a restriction from placing the second UDF at a disk process, based upon at least one of:

an estimated processor utilization of the second UDF exceeding a processor utilization threshold;

an estimated memory utilization of the second UDF exceeding a memory utilization threshold;

a number of UDF executions at the disk process exceeding a threshold number of allowed UDF executions;

a size of the second UDF exceeding a UDF size allowance threshold; or an amount of filtering provided by the second UDF when used as a predicate for the relational operator being below a filtering threshold.

7. The system of claim 1, comprising:

a UDF compiler, configured to:

receive code written in a procedural language; and compile the code into the UDF.

8. The system of claim 1, wherein:

the query plan comprises a relational tree comprising the components of the query ordered in the execution order within the relational tree, wherein the components comprise the relational operator; and the DBMS compiler is configured to attach the instance of the UDF to the relational operator by coupling the instance of the UDF as an expression item accessible to the relational operator in the relational tree.

9. The system of claim 1, wherein the DBMS compiler is configured to:

identify whether the UDF exceeds a resource use threshold; and in response to determining that the UDF exceeds the resource use threshold, restrain implementation of the UDF at a disk process; and in response to determining that the UDF does not exceed the resource use threshold, permit implementation at least one: the disk process, an executor server process (ESP), or at an application coordinator.

10. The system of claim 9, wherein the DBMS compiler is configured to:

in response to determining that the UDF exceeds the resource use threshold, determining, based upon characteristics of the UDF, characteristics of an execution of the query, or both, whether the UDF can run in parallel;

in response to determining the UDF can run in parallel, cause parallel implementation of the UDF at the ESP, the application coordinator, or both; and in response to determining that the UDF cannot run in parallel, cause serial implementation of the UDF.

11. The system of claim 1, wherein the UDF encapsulates weights of an Artificial Intelligence (AI) model to invoke the AI model directly via the execution engine, indirectly from a remote procedure call, or both.

12. A computer-implemented method, comprising:

receive a user-defined function (UDF);

receive a query comprising:

a relational operator; and an indication of the UDF;

compile the query, by attaching an instance of the UDF to the relational operator in a query plan indicating an execution order of components of the query by implementing the instance of the UDF as a scalar operator of the relational operator within the query plan based on one or more inputs of the instance of the UDF being available at the relational operator; and provide the query plan with the attached instance of the UDF to a database management system (DBMS) execution engine to cause a direct implementation of both the instance of the UDF and the relational operator by the DBMS execution engine in accordance with the query plan.

13. The computer-implemented method of claim 12, comprising performing the query plan, by implementing both the UDF and the relational operator via the DBMS execution engine, in accordance with the query plan.

14. The computer-implemented method of claim 13, comprising implementing:

a plurality of portions of the relational operator in parallel; and a plurality of instances of the UDF in parallel.

15. The computer-implemented method of claim 13, comprising:

receiving a second UDF;

refraining from targeting implementation of the second UDF to the DBMS execution engine based upon at least one of:

identifying that the second UDF includes an embedded query;

identifying that an input of the second UDF is not available at the relational operator in the query plan;

identifying a number of a particular component type exceeds a threshold allowance; or identifying that a locational constraint of the second UDF is not met by the relational operator; and targeting the implementation of the second UDF to a UDF interpreter separate from the DBMS execution engine.

16. The computer-implemented method of claim 15, comprising:

identifying that the locational constraint of the second UDF is not met by the relational operator, wherein the locational constraint comprises a restriction from placing the second UDF at a disk process where the relational operator is implemented, based upon at least one of:

an estimated processor utilization of the second UDF exceeding a processor utilization threshold;

an estimated memory utilization of the second UDF exceeding a memory utilization threshold;

a number of UDF executions at the disk process exceeding a threshold number of allowed UDF executions;

a size of the second UDF exceeding a UDF size allowance threshold; or an amount of filtering provided by the second UDF when used as a predicate for the relational operator is below a filtering threshold.

17. A non-transitory, computer-readable medium, comprising computer-readable instructions that, when executed by one or more processors of one or more computers, cause the one or more computers to:

receive a user-defined function (UDF) configured to return a value based upon operations to data in a database;

receive a database query comprising:

a relational operator; and an indication of the UDF associated with the relational operator in the database query;

compile the database query, targeting execution of the UDF directly by a database management system (DBMS) execution engine that executes the relational operator, by attaching an instance of the UDF to the relational operator in a query plan indicating an execution order of components of the database query by implementing the instance of the UDF as a scalar operator of the relational operator within the query plan based on one or more inputs of the instance of the UDF being available at the relational operator; and provide the query plan with the attached instance of the UDF to the DBMS execution engine to cause a direct implementation of both the instance of the UDF and the relational operator by the DBMS execution engine in accordance with the query plan.

18. The non-transitory, computer-readable medium of claim 17, comprising computer-readable instructions that, when executed by the one or more processors of the one or more computers, cause the one or more computers to:

implement the UDF as a first class citizen of the database that is accessible by an execution of the relational operator.

19. The non-transitory, computer-readable medium of claim 17, comprising computer-readable instructions that, when executed by the one or more processors of the one or more computers, cause the one or more computers to:

receive a second UDF;

determine to refrain from targeting implementation of the second UDF to the DBMS execution engine in response to at least one of:

identifying that the second UDF includes an embedded query;

identifying that an input of the second UDF is not available at the relational operator in the query plan; or identifying that a locational constraint of the second UDF is not met by the relational operator; and in response to determining to refrain from targeting the implementation of the second UDF to the DBMS execution engine, target implementation of the second UDF to a UDF interpreter separate from the DBMS execution engine.

20. The system of claim 1, wherein the computer-implementable instructions of the DBMS compiler comprise a DBMS attachment service, and wherein the DBMS attachment service is configured to attach the instance of the UDF to the relational operator in the query plan based on identifying a plurality of attachment conditions comprising at least:

the one or more inputs of the instance of the UDF being available at the relational operator, the instance of the UDF not including an embedded query, a number of a particular component type of the instance of the UDF not exceeding a threshold allowance, and one or more locational constraints of the UDF being met by the relational operator.

* * * * *